US008327377B2

(12) United States Patent
Krishnamurthy et al.

(10) Patent No.: US 8,327,377 B2
(45) Date of Patent: Dec. 4, 2012

(54) DETECTING, LOGGING AND TRACKING COMPONENT DEPENDENCIES IN WEB SERVICE TRANSACTIONS

(75) Inventors: Anand Krishnamurthy, Fremont, CA (US); Stewart Thain, Livingston (GB); Todd Rader, Menlo Park, CA (US); Michael Goulet, Newton, MA (US)

(73) Assignee: CA, Inc., Islandia, NY (US)

( * ) Notice: Subject to any disclaimer, the term of this patent is extended or adjusted under 35 U.S.C. 154(b) by 728 days.

(21) Appl. No.: 12/433,593

(22) Filed: Apr. 30, 2009

(65) Prior Publication Data
US 2010/0281488 A1 Nov. 4, 2010

(51) Int. Cl.
G06F 9/54 (2006.01)
G06F 9/44 (2006.01)
(52) U.S. Cl. .................... 718/106; 718/100; 717/104
(58) Field of Classification Search .................. None
See application file for complete search history.

(56) References Cited

U.S. PATENT DOCUMENTS

| 5,423,057 | A | * | 6/1995 | Kuznicki et al. ............. 340/7.43 |
| 5,893,118 | A | * | 4/1999 | Sonderegger ........................ 1/1 |
| 5,956,479 | A | | 9/1999 | McInerney |
| 6,260,187 | B1 | | 7/2001 | Cirne |
| 6,286,047 | B1 | | 9/2001 | Ramanathan |
| 6,801,937 | B1 | | 10/2004 | Novaes |
| 7,065,717 | B1 | * | 6/2006 | Perkins et al. ................ 715/854 |
| 2002/0174268 | A1 | * | 11/2002 | Goward et al. ............... 709/331 |
| 2004/0039728 | A1 | * | 2/2004 | Fenlon et al. ..................... 707/1 |
| 2004/0078691 | A1 | | 4/2004 | Cirne |
| 2005/0111460 | A1 | * | 5/2005 | Sahita ........................ 370/395.3 |
| 2005/0172306 | A1 | * | 8/2005 | Agarwal et al. ............... 719/328 |
| 2005/0183068 | A1 | * | 8/2005 | Cwalina et al. ............... 717/128 |
| 2005/0187916 | A1 | * | 8/2005 | Levin et al. ....................... 707/3 |
| 2005/0235248 | A1 | | 10/2005 | Victoria |
| 2006/0112370 | A1 | * | 5/2006 | Irving et al. .................. 717/100 |
| 2006/0242292 | A1 | | 10/2006 | Carter |
| 2007/0038983 | A1 | | 2/2007 | Stienhans |
| 2007/0143323 | A1 | * | 6/2007 | Vanrenen et al. ............. 707/101 |
| 2007/0143743 | A1 | | 6/2007 | Cobb |
| 2007/0174185 | A1 | | 7/2007 | McGoveran |
| 2008/0162202 | A1 | * | 7/2008 | Khanna et al. .................... 705/7 |

(Continued)

OTHER PUBLICATIONS

Wily SOA Manager article, EMA Impact Brief, 2007.*

(Continued)

Primary Examiner — Meng An
Assistant Examiner — Benjamin Wu
(74) Attorney, Agent, or Firm — Vierra Magen Marcus & DeNiro LLP

(57) ABSTRACT

Relationships between components in an application and the services they provide are identified, including redundant caller-callee sequences. Specific components of interest are instrumented to obtain data when they execute. Data structures are created which identify the components and their dependencies on one other. To avoid excessive overhead costs, redundant dependencies are identified. A dependency data structure can be provided for each unique dependency. When repeated instances of a dependency are detected, the associated dependency data structure can be augmented with correlation data of the repeated instances, such as transaction identifiers and sequence identifiers. Sequence identifiers identify an order in which a component is called. A flag can be used to force the creation of a new dependency data structure, and a calling component's name can be used instead of a sequence identifier. Agents report the dependency data structures to a manager to provide graph data in a user interface.

12 Claims, 17 Drawing Sheets

U.S. PATENT DOCUMENTS

| | | |
|---|---|---|
| 2008/0216098 A1* | 9/2008 | Agarwal et al. ............... 719/328 |
| 2008/0222287 A1* | 9/2008 | Bahl et al. .................... 709/224 |
| 2008/0270477 A1* | 10/2008 | Starkey et al. ............. 707/104.1 |
| 2009/0144305 A1* | 6/2009 | Little ........................... 707/101 |
| 2009/0248494 A1* | 10/2009 | Hueter et al. .................. 705/10 |
| 2010/0131854 A1* | 5/2010 | Little ........................... 715/735 |
| 2010/0241690 A1* | 9/2010 | Kurapati et al. .............. 709/203 |

OTHER PUBLICATIONS

CA Wily tracks SOA, Web services transactions, story from Network World, Mar. 19, 2007.*

* cited by examiner

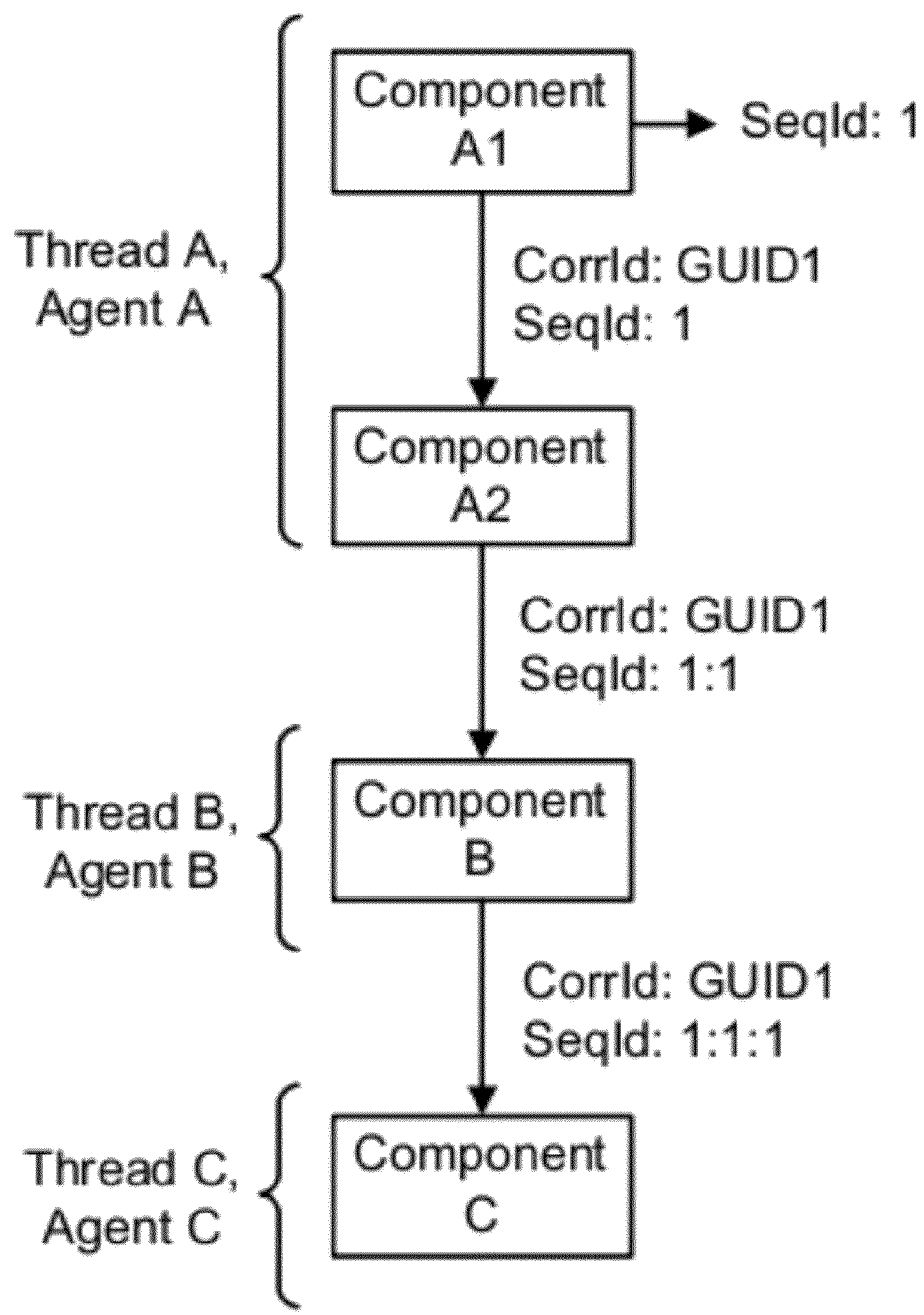

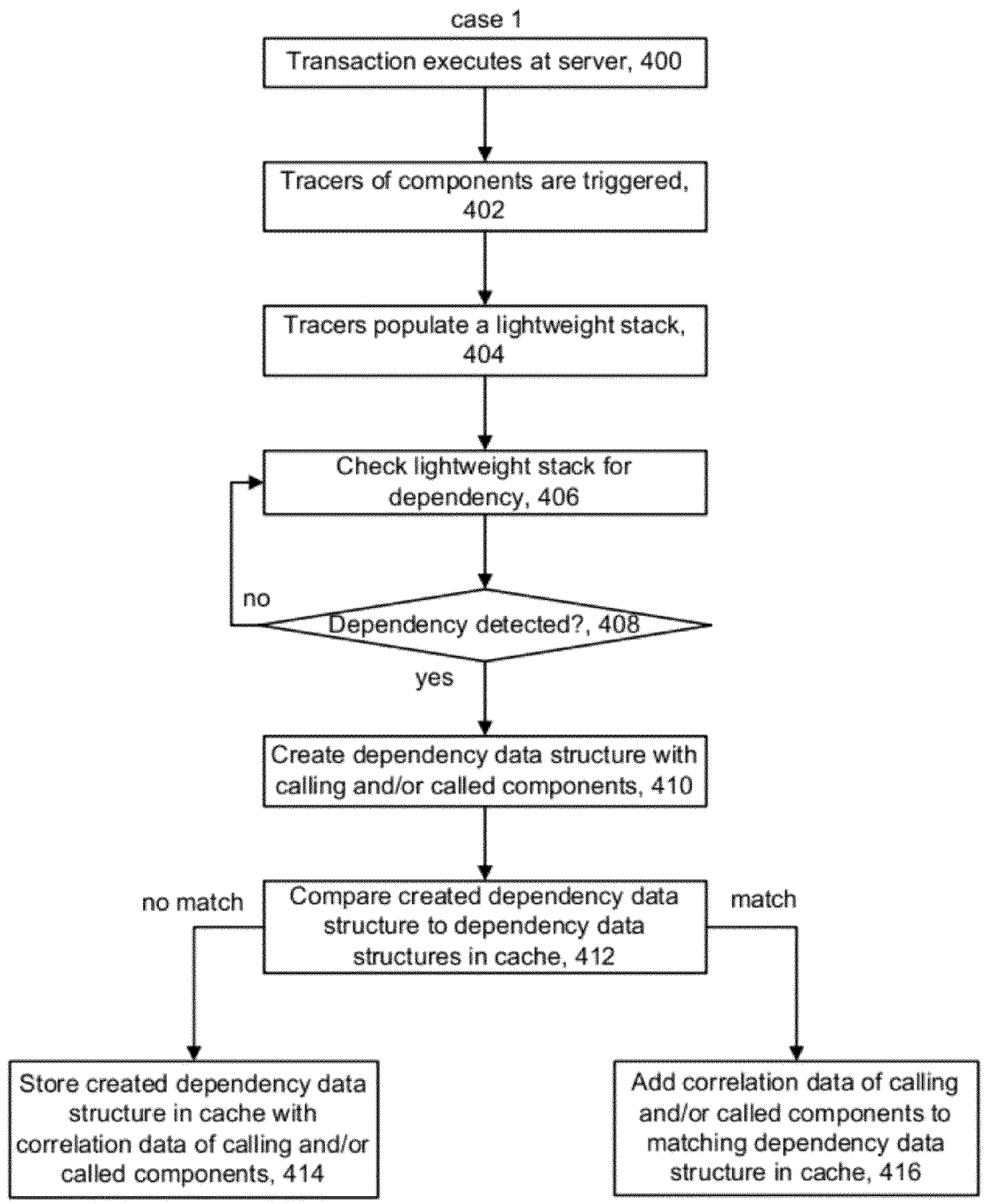

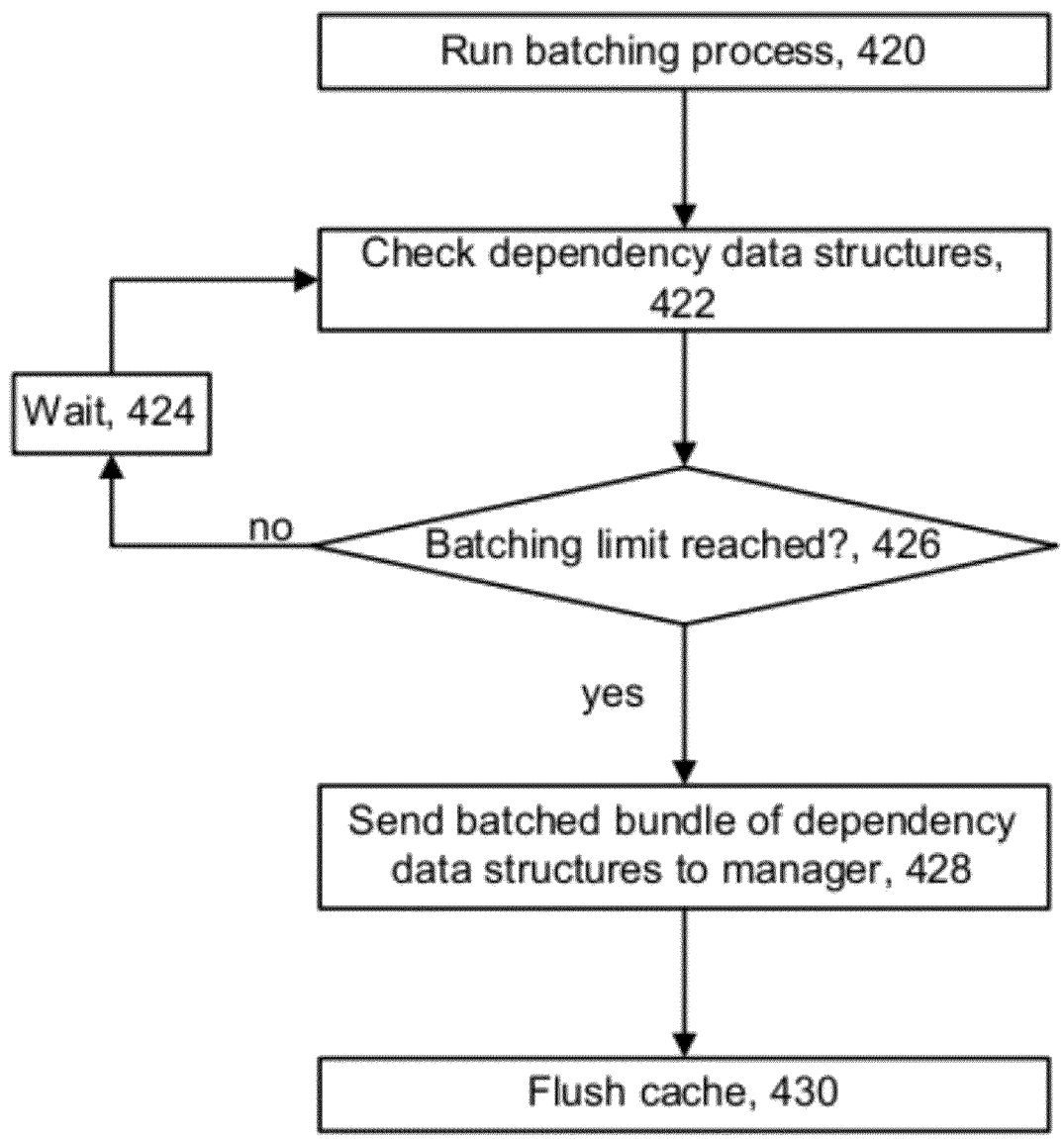

Fig. 4d

430 → GUID1: A1 (SeqId=1)→A2 (SeqId=1)→ B (SeqId=1:1)→C (SeqId=1:1:1)
GUID2: A1 (SeqId=1)→ A2 (SeqId=1)→B (SeqId=1:1)
GUID3: A1 (SeqId=1)→ C (SeqId=1:1)

432 →

Dependency data structure (agent A)

| Dependency: | SeqId | CorrId: |
|---|---|---|
| A1→ A2 | 1 | GUID1 |
|  | 1 | GUID2 |

434 →

Dependency data structure (agent A)

| Dependency: | SeqId | CorrId: |
|---|---|---|
| A1 | 1 | GUID3 |

436 →

Dependency data structure (agent B)

| Dependency: | SeqId | CorrId: |
|---|---|---|
| B | 1:1 | GUID1 |
|  | 1:1 | GUID2 |

438 →

Dependency data structure (agent C)

| Dependency: | SeqId | CorrId: |
|---|---|---|
| C | 1:1:1 | GUID1 |
|  | 1:1 | GUID3 |

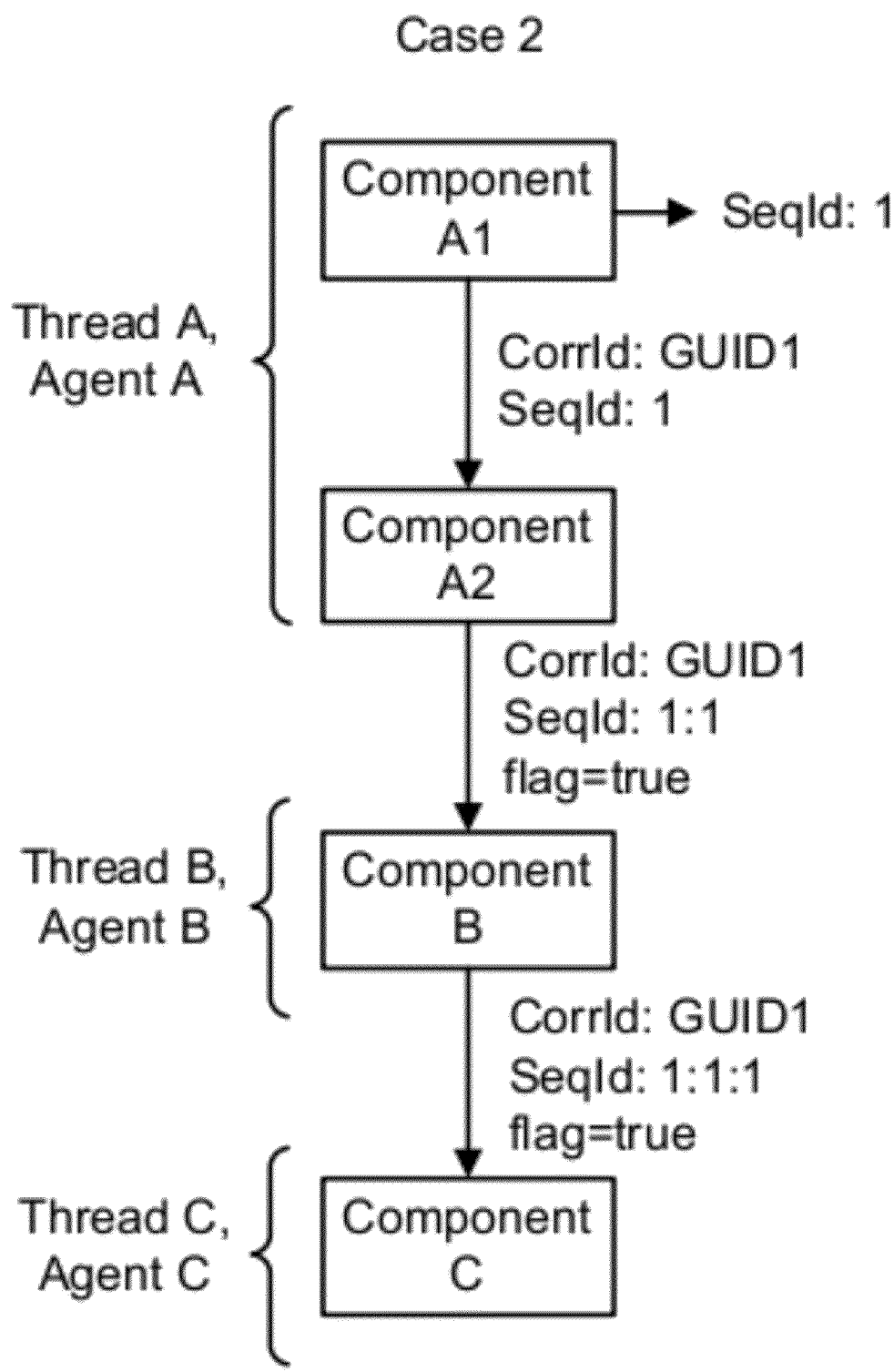

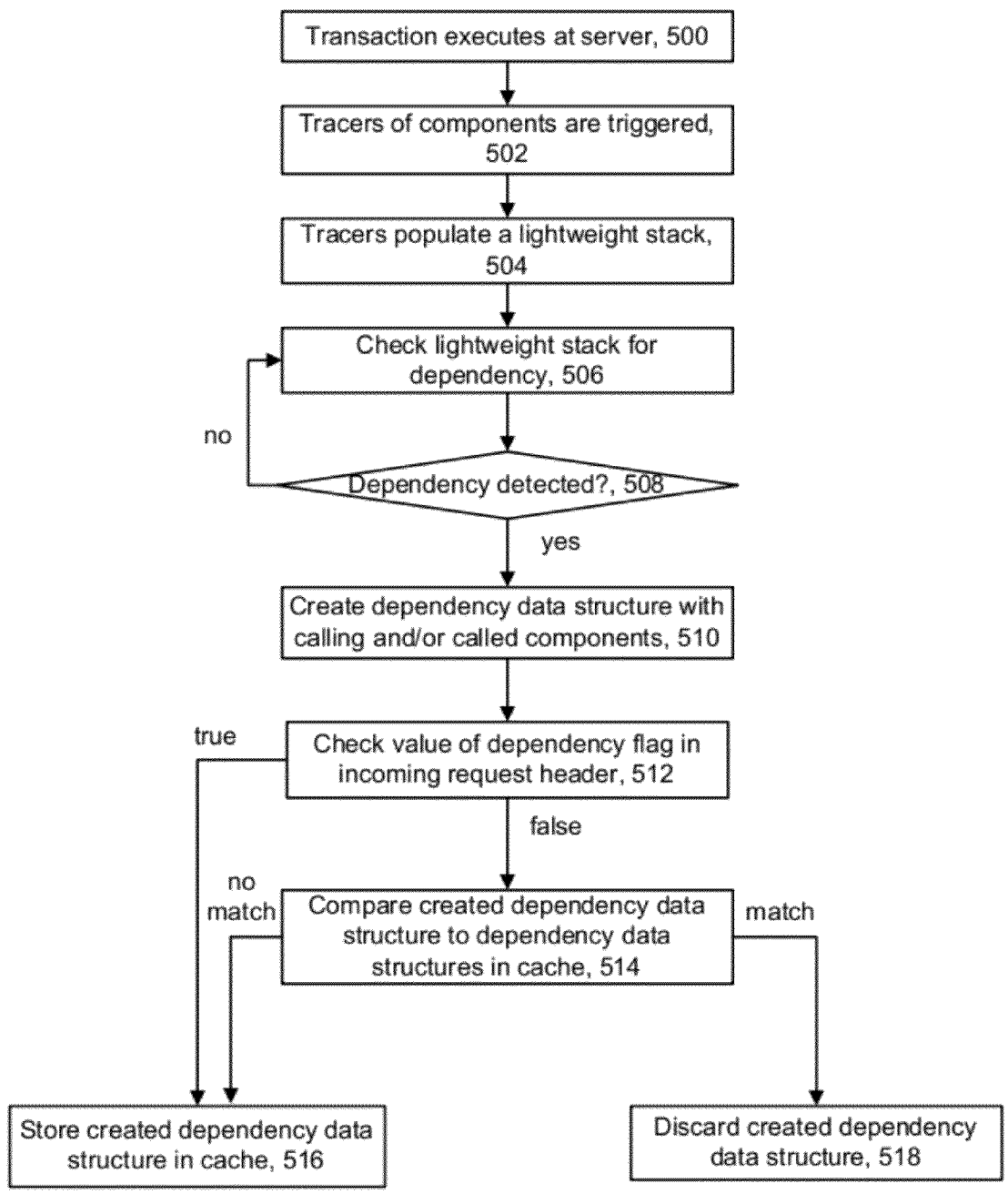

GUID1: A1 (SeqId=1)→A2 (SeqId=1)→ B (SeqId=1:1; flag=true)→C (SeqId=1:1:1; flag=true)
GUID2: A1 (SeqId=1)→ A2 (SeqId=1)→B (SeqId=1:1; flag=false)
GUID3: A1 (SeqId=1)→ C (SeqId=1:1; flag=true)

532 →

| Dependency data structure (agent A) | | |
|---|---|---|
| Dependency: | SeqId | CorrId: |
| A1→ A2 | 1 | GUID1 |

534 →

| Dependency data structure (agent A) | | |
|---|---|---|
| Dependency: | SeqId | CorrId: |
| A1 | 1 | GUID3 |

536 →

| Dependency data structure (agent B) | | |
|---|---|---|
| Dependency: | SeqId | CorrId: |
| B | 1:1 | GUID1 |

538 →

| Dependency data structure (agent C) | | |
|---|---|---|
| Dependency: | SeqId | CorrId: |
| C | 1:1:1 | GUID1 |
|   | 1:1 | GUID3 |

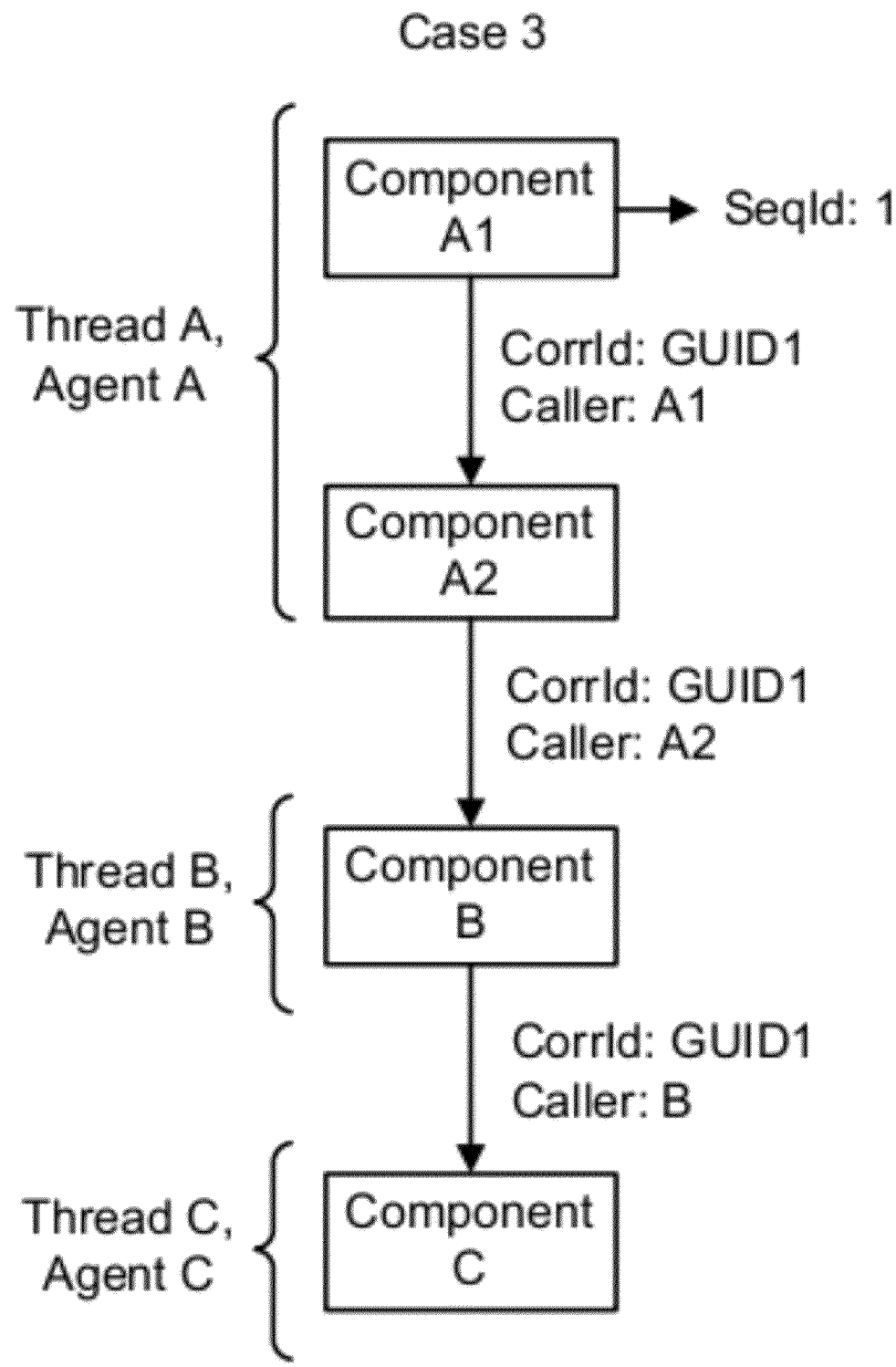

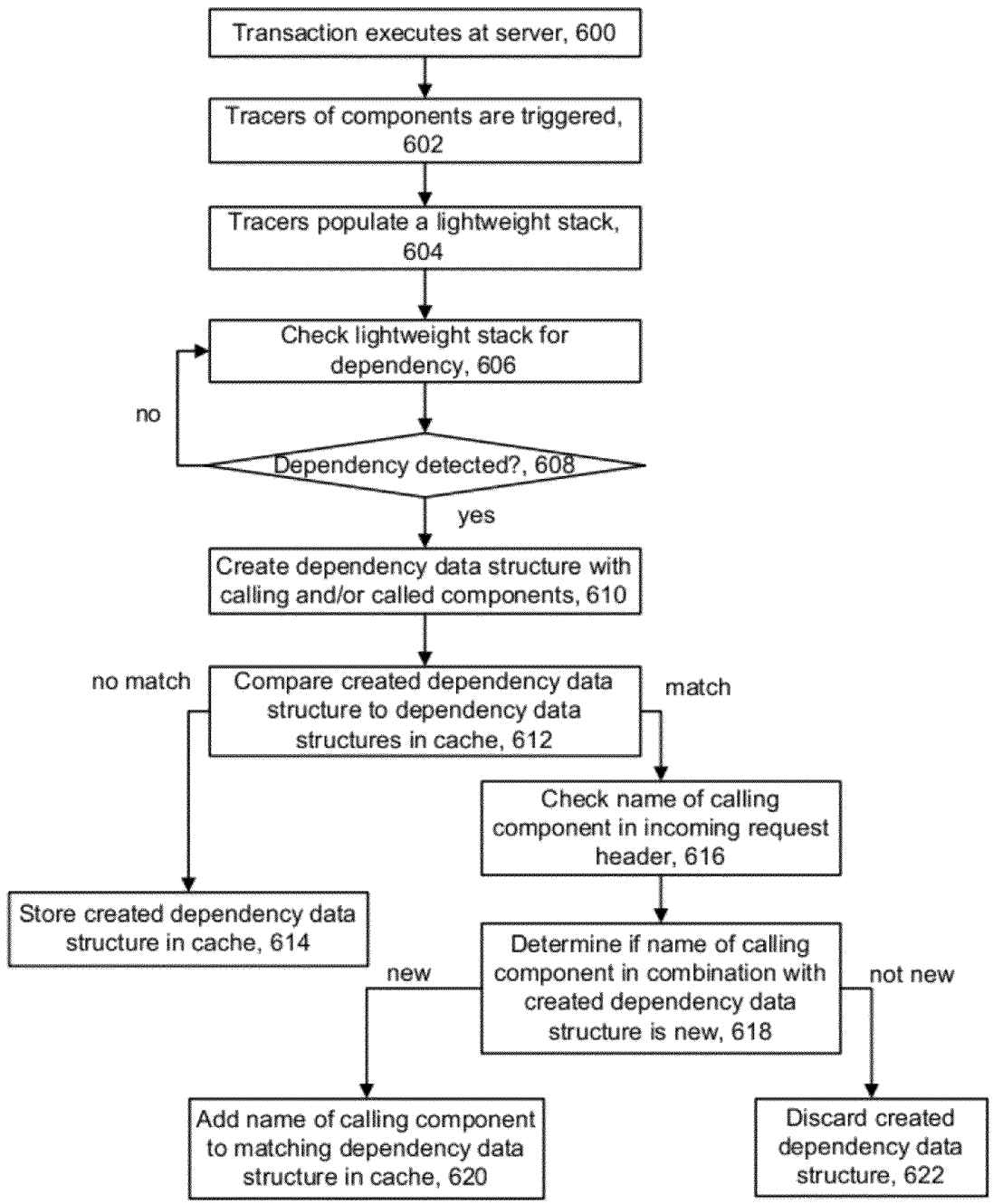

Fig. 9b

```
- Super Domain
  - AxisAgent
    ├─ EM Host
    ├─ Java Version
    ├─ Launch Time
    ├─ ProcessID
    ├─ Virtual Machine
    + Agent Stats
    + Backends
    + CPU
    + Frontends
    + GC Heap
    + Heuristics
    + JSP
    + Servlets
    + Sockets
    - Web Services
      - Client
        + http_//CheckingAccount.demobank.ca.com
        - http_//ClearingHouse.demobank.ca.com
          ├─ Average response time (ms)
          ├─ Concurrent invocations
          ├─ Errors per interval
          ├─ Responses per interval
          ├─ Stall Count
          + process transfer
        + http_//SmallBusinessAccount.demobank.ca.com
      - Server
        + http_//CheckingAccount.demobank.ca.com
        + http_//ClearingHouse.demobank.ca.com
        + http_//SmallBusinessAccount.demobank.ca.com
+ Domains
```

904

DETECTING, LOGGING AND TRACKING COMPONENT DEPENDENCIES IN WEB SERVICE TRANSACTIONS

BACKGROUND OF THE INVENTION

1. Field of the Invention

The present invention is directed to technology for monitoring applications in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

For example, for component-based applications, such as those based on Java 2 Platform Enterprise Edition (J2EE), one approach is to collect data about the individual software components that are invoked in an application. A software component generally refers to a software technology for encapsulating software functionality. A software component has characteristics including: multiple-use (reusable), non-context-specific, composable with other components, encapsulated, and a unit of independent deployment and versioning. Alternatively, a component can be considered to be an object written to a specification, such as Java Beans, or the Component Object Model, a Microsoft platform for software componentry. A component can also include a web server or a database, for instance. Software components are typically invoked by processes or threads executing in an application, middleware or other software.

For example, for a web-based e-commerce application, a process or transaction at an application server is typically initiated by a request to the server, such as a user request to purchase an item. The process may invoke a number of components to carry out the steps necessary to allow the user to purchase the item. For example, a shopping cart component may be used to allow the user to identify the item desired, the payment method and the shipping information. A reservation component may be used to reserve the item while a credit check component verifies the user's credit card information. Once the credit card information is verified, an inventory component is updated based on the item purchased, and a shipping component is invoked to arrange for the item to be shipped, such as by contacting a warehouse. An order completion component may be invoked to confirm the purchase to the user such as by providing an order confirmation number and a tracking number on a web page. Moreover, a given component may be invoked more than once during an application.

For debugging and other purposes, it is desirable to understand the flow of an application and relationships between components and the services they provide. To this end, instrumentation can be added to the components to provide a trace, which is a detailed record of the steps a computer program executes. The trace identifies each component that is invoked in a transaction and can provide performance data such as the execution time of each component. One type of trace is a stack trace. However, using such trace data for analysis can consume an excessive amount of overhead data and thereby impact the very application which is being monitored.

SUMMARY OF THE INVENTION

Techniques are provided for efficiently identifying relationships between components in an application and the services they provide, and to an associated user interface.

In one embodiment, a computer-implemented method is provided for identifying dependencies among components in an application. The method includes: (a) accessing first information identifying a first dependency comprising at least one component which executes in a first thread of a transaction, and which is called by at least one component which executes in another thread of the transaction, (b) determining if there is a matching dependency for the first dependency in a store of at least one dependency data structure, (c) if there is the matching dependency in the store, accessing second information which identifies the at least one component which executes in the another thread, and determining if the matching dependency is associated with the second information, (d) if the matching dependency is not associated with the second information, adding the second information to a dependency data structure of the matching dependency in the store, and (e) communicating dependency data structures in the store to the manager for use in providing a graphical user interface which depicts dependencies among components of the application.

In another embodiment, a computer-implemented method is provided for identifying dependencies among components in an application. The method includes: (a) accessing first information identifying (i) a first dependency comprising at least one component which executes in a first thread of a transaction, and which is called by at least one component which executes in another thread of the transaction, and (ii) a sequence identifier which indicates an order in which the at least one component of the first thread was called by the at least one component of the another thread, (b) determining if there is a matching dependency for the first dependency in a store of at least one dependency data structure, (c) if there is the matching dependency in the store, adding the sequence identifier to a dependency data structure of the matching dependency in the store, (d) if there is not the matching dependency in the store, providing a new dependency data structure in the store which includes the at least one component which executes in the first thread and the sequence identifier, and (e) communicating dependency data structures in the store to a manager for use in providing a graphical user interface which depicts dependencies among components of the application.

In another embodiment, a computer-implemented method is provided for identifying dependencies among components in an application. The method includes: (a) accessing first information identifying a first dependency comprising at least one component which executes in a first thread of a transaction, and which is called by at least one component which executes in another thread of the transaction, (b) accessing a flag, (c) if the flag is set one way (e.g., true), providing a new dependency data structure in a store which includes the at least one component which executes in the first thread, and the sequence identifier, (d) if the flag is set another way (e.g., false), determining if there is a matching dependency for the first dependency in the store, the store comprises at least one dependency data structure, (e) if the flag is set the another way, and if there is the matching dependency in the store, discarding the first information without storing a new dependency data structure in the store which includes the first information, (f) if the flag is set the another way, and if there is not the matching dependency in the store, providing a new dependency data structure in the store which includes the first information, and (g) communicating dependency data structures in the store to a manager for use in providing a graphical user interface which depicts dependencies among components of the application.

In another embodiment, a computer-implemented method is provided for identifying dependencies among components in an application. The method includes: (a) receiving dependency data structures at a manager, the dependency data structures include identifiers of components of the application which execute in different threads of a transaction, and an indication of caller-callee relationships among the components, (b) preparing graph data based on the dependency data structures, the graph data is based on the identifiers of the components and the indication of the caller-callee relationships, (c) receiving a user command via a graphical user interface to access the graph data for at least a portion of the components, (d) accessing the graph data based on the user command, and (e) providing a graphical user interface using the accessed portion of the graph data, where the graphical user interface depicts caller-callee relationships among the at least a portion of the components, and names of services of the application which are represented by the at least a portion of the components.

Corresponding methods, systems and computer- or processor-readable storage devices which have executable code for performing the methods provided herein may also be provided.

BRIEF DESCRIPTION OF THE DRAWINGS

FIG. 4a depicts a sequence of components, with some executing in the same thread.

FIG. 4b depicts a first process for identifying dependencies among components.

FIG. 4c depicts a batch process for communicating data identifying dependencies among components to a manager.

FIG. 4d depicts dependency data structures based on the process of FIG. 4b.

FIG. 5a depicts a sequence of components, with some executing in the same thread, and the use of a dependency flag.

FIG. 5b depicts a second process for identifying dependencies among components.

FIG. 5c depicts dependency data structures based on the process of FIG. 5b.

FIG. 6a depicts a sequence of components, with some executing in the same thread, and the use of a caller name.

FIG. 6b depicts a second process for identifying dependencies among components.

FIG. 9b depicts a portion of the user interface of FIG. 9a.

DETAILED DESCRIPTION

The present invention provides techniques for efficiently identifying relationships between components in an application and the services they provide, and to an associated user interface.

Figure 1:
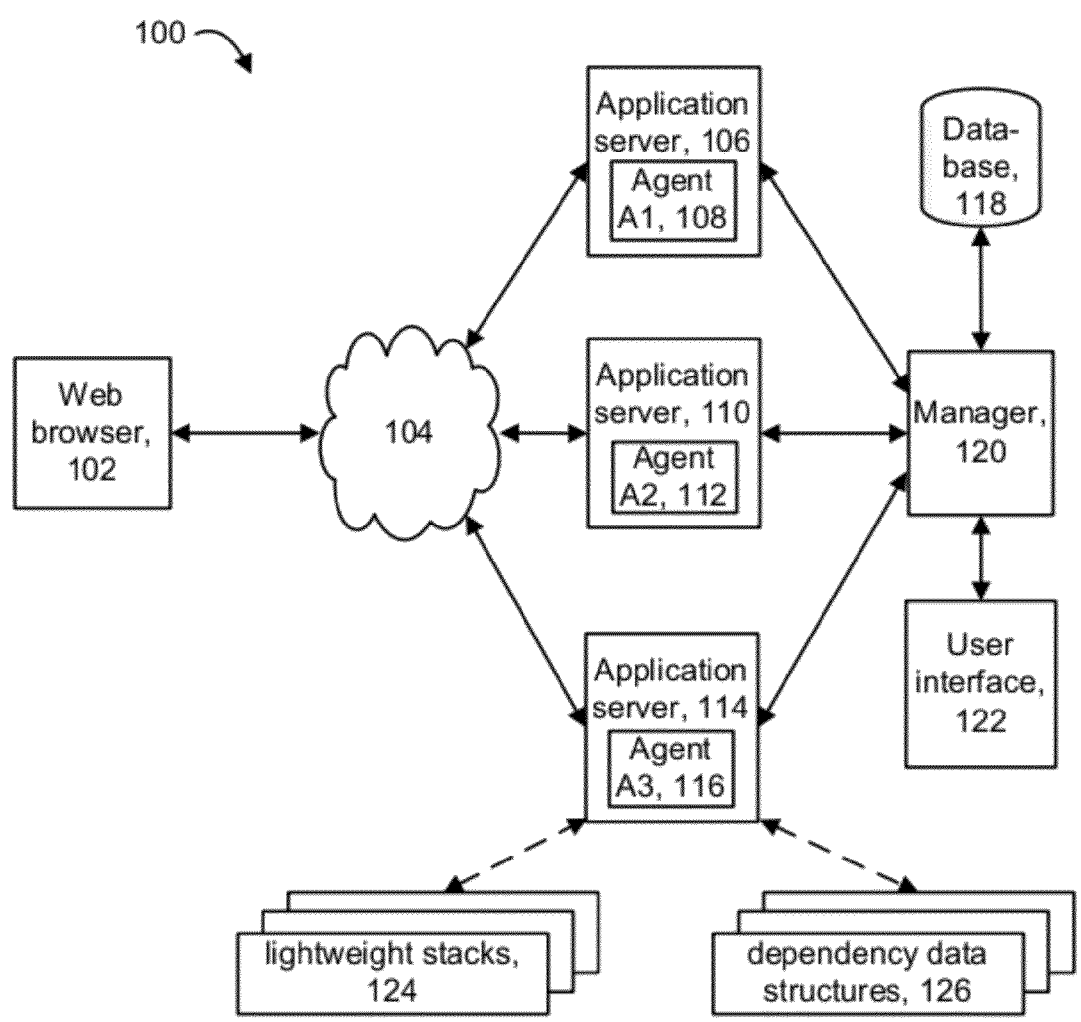
FIG. 1 depicts a network in which different computer systems provide data to a manager.

FIG. 1 depicts a network 100 in which different computer systems provide data to a manager. Example computer systems 106, 110 and 114 may include application servers or any other type of computer system having a processor for executing code to achieve a desired functionality. The computer systems can be located remotely from one another or co-located. The computer systems 106, 110 and 114 communicate with a local manager computer 120 in this example. The manager computer 120 could alternatively be remote from the computer systems 106, 110 and 114, in which case communication may occur via the network cloud 104.

For example, a corporation running an enterprise application such as a web-based e-commerce application may employ a number of application servers at one location for load balancing. Requests from users, such as from an example web browser 102 of a user, are received via a network cloud 104 such as the Internet, and can be routed to any of the computer systems 106, 110 and 114. The web browser 102 typically accesses the network cloud 104 via an Internet Service Provider, not shown. Agent software running on the computer systems 106, 110 and 114, denoted by Agent A1 (108), Agent A2 (112) and Agent A3 (116), respectively, gather information from an application, middleware or other software, running on the respective computer systems 106, 110 and 114, in one possible approach. For example, such information may be obtained using instrumentation, one example of which is byte code instrumentation. However, the gathered data may be obtained in other ways as well. The agents essentially live in the computer system being monitored and provide a data acquisition point. The agents organize and optimize the data communicated to the manager 120.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 120, or process the information locally, such as to determine whether the information indicates an abnormal condition. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local computer system 106, 110 and 114, respectively, with which they are associated.

The manager 120 can be provided on a separate computer system such as a workstation which communicates with a user interface 122, such as a monitor, to display information based on data received from the agents. The manager can also access a database 118 to store the data received from the agents. In the example provided, the computer systems can communicate with the manager 120 without accessing the network cloud 104. For example, the communication may occur via a local area network. In other designs, the manager 120 can receive data from the agents of a number of computer systems via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computer system arrangements mentioned, a single computer system can be monitored as well with one or more agents.

The agents may each maintain lightweight stacks 124 and dependency data structures 126, as discussed below.

Figure 2:
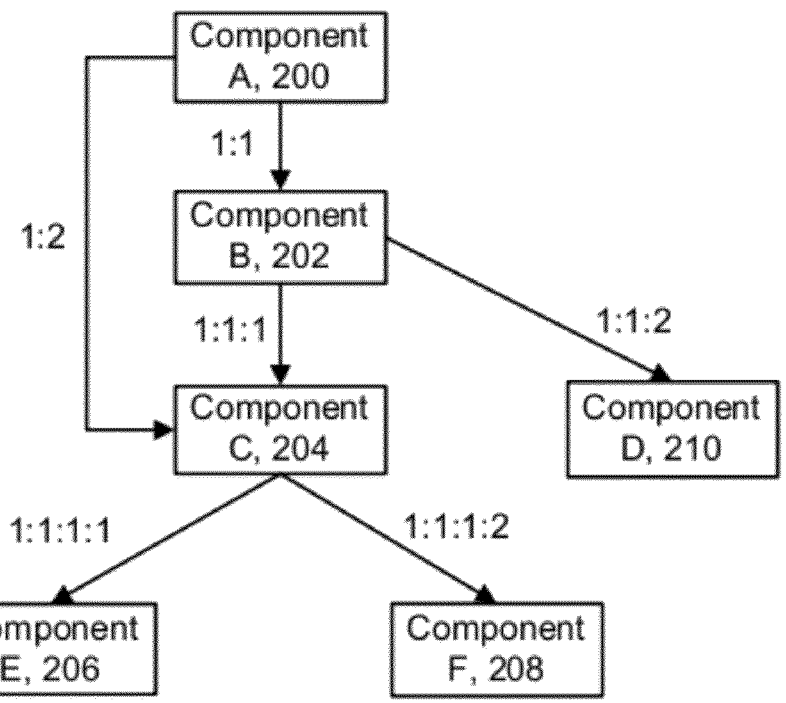
FIG. 2 depicts dependencies in an example sequence of components invoked in a transaction.

FIG. 2 depicts dependencies in an example sequence of components invoked in a transaction. Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used. Moreover, the programming model need not be object oriented.

The components may correlate with business logic or e-commerce steps in an application, in one possible implementation. Here, component A (200) separately calls component B (202) and component C (204), not necessarily concurrently. Component B (202) also calls component C (204). Component C (204) calls component E (206) and component F (208), not necessarily concurrently. Component B (202) also calls component D (210). Moreover, for each call, a sequence identifier is provided which indicate a sequence in which components are called. The sequence identifier can be expressed, e.g., by numbers separated by colons. Each number represents a sequence of the associated calling component in a transaction.

For example, the sequence identifier 1:1 in the call from component A to component B indicates that component A is the first component in a transaction and component B is the first component called by component A. The sequence identifier 1:2 in the call from component A to component C indicates that component A is the first component in a transaction and component C is the second component called by component A. The sequence identifier 1:1:1 in the call from component B to component C indicates that component C is the first component called by component B, and that there are two components before C in a sequence. The sequence identifier 1:1:2 in the call from component B to component D indicates that component D is the second component called by component B.

Similarly, the sequence identifier 1:1:1:1 in the call from component C to component E indicates that component E is the first component called by component C, and that there are three components before C in a sequence, and the sequence identifier 1:1:1:2 in the call from component C to component F indicates that component F is the second component called by component C. The length of the sequence identifier indicates how many prior components are in a sequence of called components. As described further below, each calling component can inform the called component of the sequence identifier and other correlation data in a header of a data packet, for instance.

The use of sequence identifiers is one possible approach to distinguishing different sequences of components. For example, the sequences C→E and C→F could be preceded by A→C or A→B→C. Similarly, the sequence A→B could be followed by B→C→E, B→C→F or B→D. The use of sequence identifiers resolves the alternative possibilities.

Note also that a component can continue executing after calling another component, which begins executing, in an asynchronous, multi-thread or multi-process mode, or can temporarily pause until the called component has finished executing, in a synchronous, single-thread or single-process mode. Moreover, a given component may be invoked more than once during a transaction.

Figure 3:
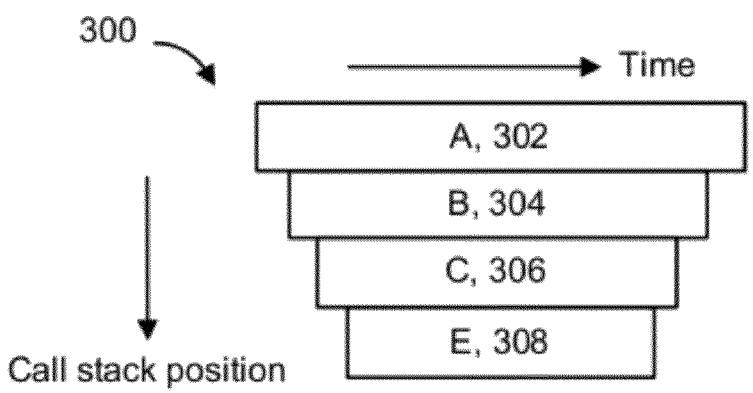
FIG. 3 depicts an example call stack depth versus time representation of a sequence of components invoked in a transaction, based on one possible sequence of components of FIG. 2.

FIG. 3 depicts an example call stack depth versus time representation of a sequence of components invoked in a transaction, based on one possible sequence of components of FIG. 2. The horizontal direction represents time, while the vertical direction indicates call stack depth or position. A call stack identifies instrumented components which have been called or invoked during the execution of one or more programs or threads. In the graphical representation 300, which can be provided on a user interface display, for instance, component A (302) is the first or root component of the call stack. Components B (304), C (306) and E (308), are at second, third and fourth layers of the call stack, respectively. After A begins to execute, at the start of a transaction, B is called. After B begins to execute, C is called. After C begins to execute, E is called. After E, C and B successively finish executing, component A and the transaction, finish executing. Trace data of instrumented components can be used along with dependency data to understand and debug an application.

FIG. 4a depicts a sequence of components, some executing in different respective threads. Different threads may execute in different Java Virtual Machines (JVMs), for instance, on the same or different computing systems. A different agent may be associated with each computing system. Selected components, such as the boundary components of transactions, e.g. components which execute at the beginning and end of a transaction, may be instrumented. In this example, component A1 executes in a thread A, associated with an agent A, and is the first instrumented component in a transaction. Accordingly, a sequence identifier (SeqId)=1 may be associated with component A1. A transaction or correlation identifier (CorrId), which is a globally unique identifier (GUID), can be associated with A1. A1 calls component A2 in the same thread. Since A2 is on the same thread as A1, the same SeqId is used. Essentially, the SeqID applies o the dependency of A1→A2.

The associated agent for components A1 and A2 can use the trace data (e.g., FIG. 3) to ascertain that component A2 was called by component A1, so there is no need for a separate SeqId for A1. Moreover, A1 need not communicate SeqId to A2. A separate SeqId could be used, but would result in additional overhead costs.

Component A2 calls component B, such as in a cross-JVM or cross-agent call, sending certain correlation data, e.g., in a transport header. The correlation data can be a list of key-value pairs. Thus, when components call each other across agents, their transport headers are decorated with correlation data. This correlation data can include CorrId=GUID1, and a SeqId which is to be used by the called component, e.g., SeqId=1:1. Other variants of correlation data are provided herein. Generally, CorrId is used to determine which dependencies are related to one another, and the other correlation data determine the direction of the edge (e.g., A2→B not B→A2).

The calling component name and/or a dependency flag, discussed further below, can also be sent in some cases. SeqId=1:1 indicates that component B is the first component called by component A2. In response to the call from A2, component B executes in a thread B, associated with an agent B. For example, the different threads can be on different computing systems so that the call from A2 to B is an inter-computing system call. If A2 calls B using the Simple Object Access Protocol (SOAP), for instance, agent A decorates the SOAP request with correlation data which can be retrieved by agent B. Similarly, component B calls component C, with correlation data including CorrId=GUID1, and SeqId=1:1:1. In response to the call from component B, component C executes in a thread C, associated with an agent C. Note that the same transaction identifier is relayed among the components since the components are executed as part of a common transaction.

Generally, a component which calls another component is dependent on the other component to carry out some software task. As mentioned at the outset, it is desirable to understand the flow of an application and relationships between components and the services they provide. For example, when components represent web services, it would be advantageous to be able to provide a map of web service dependencies across different JVMs or computing systems at a granularity of an application transaction. However, such a feature must be provided in an efficient manner to avoid impacting the performance of the monitored application. Transaction traces are a heavyweight representation of individual application transactions and can therefore only be used in selected time intervals instead of being used all of the time, to avoid imposing an unacceptable performance impact and overhead cost. Performance data can be also obtained from aggregations of individual transactions over selected time intervals, but this is too coarse grained.

One potential solution uses a lightweight transaction trace stack 124 (FIG. 1) associated with each agent that stores the boundary components of a transaction. Boundary components of interest can be identified beforehand and instrumented using custom tracers which result in these components being pushed onto the stack and eventually being reported to the manager for use in providing a map in the form of a user interface which represents the dependencies, e.g., a sequence of components and their caller-callee relationships, among the instrumented components. The boundary components which are identified may be different than front end/backend boundaries which are marked by front end/backend tracers. This provides flexibility in naming the components in the map to ensure that no existing metrics tied to front end/backend nodes are affected. Flexibility is also achieved in adding or removing components from the map since not all front end/backend components may be interesting components when shown in a map, and we want to show components in a map which we may not want to be marked as front end/backend components.

Web service classes (server-side and client-side) will be flagged by the map tracers as server-side and client-side map boundaries and added to the lightweight stack. A simple dependency data structure can be maintained that describes a dependency between two components. A dependency data structure may represent a set of two or more nodes with a transition or edge between them, or just a single node. The transitions can be across agents, e.g., across JVMs. Dependency data structures can be detected as part of a single agent transaction.

Whenever a dependency is detected in the lightweight stack, we construct a dependency data structure. Dependency is detected when components are added to a non-empty stack. In some approaches, the component that is added to the stack (which is a called component) and its parent (which is the calling component) form the contents of a dependency structure. We can also construct a dependency structure when only one component was added to the lightweight stack for the entire transaction, such as to cover the scenario where a component makes a cross-JVM call. We store these dependency data structures in a data store such as a cache, such as by using a hash map based on the JAVA class "ThreadLocal," to avoid synchronization chokepoints.

Another problem to solve is that the number of transactions sent from the agents to the manager will likely be directly proportional to the number of actual application transactions when the instrumentation of the lightweight boundary transactions is turned on all the time. This can result in excessive overhead costs. To address this, we can identify and remove redundant traces, and send the dependency data structures in batches to the manager.

To remove redundant traces, when adding the boundaries of a transaction to the lightweight stack, it will be very likely that many traces are identical to each other in their dependency structure. To remove these redundant traces, we can make an equivalent string representation of the dependency data structure using a concatenation of the two boundary component names (e.g., A→B becomes string AB). This string representation and the dependency data structure itself are stored as key-value pairs in a hash map. When new dependencies are detected, we check for a redundancy with pre-existing string entries in the hash map, and if such a redundancy/match is detected, we do not add this newly created dependency data structure to the hash map. Since we do not store the redundant dependency data structures, we potentially could lose some transaction granularity. For example, we might not be able to distinguish between transactions A→B and A→B→C, where B→C is a cross-JVM transaction. To avoid losing this important information, we can keep the correlation data, CorrID and SeqId, of the redundant traces. When we identify a redundant trace, we copy over the key-value pairs of CorrId and SeqId into the pre-existing dependency data structures and concatenate the current timestamp to the correlation data before storing.

Furthermore, to send dependency data structure in batches to the manager, the dependency data structures in the hash map are flushed and put in a batch data structure and sent to the manager, where the batching process is controlled by factors such as the size of the hash map and the time elapsed since the last batch was sent. This solves the web service dependency map problem and can also be applied to create a dynamic application map at the transaction granularity for any managed application environment.

FIG. 4*b* depicts a first process for identifying dependencies among components. This process involves sending all transactions in batches. We use map tracers to track boundary components for every transaction passing through an application server, for instance. Every transaction has its own lightweight agent stack. We create dependency structures from the lightweight stack, and use a redundancy removal process to determine if a matching dependency structure already exists in the agent thread cache. If a match exists, we copy the correlation data from the just-created dependency structure into the existing dependency structure in cache. If a match does not exist, we add the newly-created dependency structure into the cache. Further, a batching process may run periodically to send the dependency structures in the cache to the manager server and flush the cache. The manager creates graph data from all the dependency structures using the correlation data embedded in the dependency structures.

Regarding the correlation data, in addition to CorrId, the agent will also send the SeqId key-value pair, which determines the direction of an edge. For instance, as mentioned in connection with FIG. 4a, when component A2 associated with agent A calls component B associated with agent B, component A2 will assign itself a SeqId=1 and send a SeqId of 1:1 on the transport headers of the call request made to component B. The same type of correlation data is also embedded with the dependency structures for component A2 by agent A and for component B by agent B, and provided to the manager.

Specifically, at step 400, a transaction executes at a server, for instance. The transaction is part of a managed application, for instance. At step 402, the tracers are triggered for the components of the transaction which have been instrumented, when the components execute. This can include one or more caller/callee components on the same thread. That is, information is obtained by an agent from the instrumented components on the same computing system as the agent. At step 404, the tracers populate a lightweight stack. When a component executes, it puts itself into the stack. Step 406 includes checking the lightweight stack for a dependency. If a dependency is detected, at decision step 408, a dependency data structure which includes the calling and/or called components of a thread, is created at step 410. A dependency is detected when a new component is added to the stack. Examples of dependency data structures are provided further below.

The lightweight stack is arranged in the order of component execution. For example, if A1 calls A2, and A2 calls A3 within one thread, there will be two dependencies detected: between A1 and A2 and between A2 and A3. Moreover, a component by itself could be a dependency, or a subset of a dependency which involves another component. For example, if a component A at agent A calls component B at agent B, on a separate thread, agent A still identifies component A as being a dependency and creates a dependency data structure for it. This is done to provide a mechanism for the agent to inform the manager that component A made a call which involves a component in another thread. So, the dependency which involves component A is noted.

Step 412 includes comparing the created dependency data structure to one or more dependency data structure which may have previously been stored in a cache or other appropriate storage location. If there is no match, this means the dependency of components in the newly created dependency data structure in new to the agent, and no redundancy exists. That is, a matching dependency is not present in the cache. In this case, step 414 includes storing the created dependency data structure as a new dependency data structure in the cache. If there is a match, this means the dependency of components in the created dependency data structure has been seen before by the agent, and therefore a redundancy exists. That is, a matching dependency is present in the cache. In this case, step 416 includes adding the correlation data of the created dependency data structure to the matching dependency data structure which is already present in the cache, without adding the created dependency data structure as a new dependency data structure in the cache. This is useful because it avoids creating duplicate dependency structures, which increases overhead costs. For example, this can include adding CorrId and SeqId to the matching dependency data structure.

Step 412 essentially determines if an additional instance of a dependency has occurred. Different instances of a dependency A→B, for instance, may occur multiple times, where each occurrence has a different GUID. Having one dependency data structure with a list of different GUIDs allows us to reduce the amount of data that is reported to the manager.

The agents can communicate the dependency data structures in their respective caches to the manager from time to time for processing by the manager to provide graph data for a user interface. One possible approach uses a batch process.

FIG. 4c depicts a batch process for communicating data identifying dependencies among components to a manager. Batching can be used to limit the amount of dependent data from the cache that is reported to the manager by an agent. A batching process can be controlled by factors such as the size of the hash map/cache, the time elapsed since the last batch was sent, whether a predetermined number of the dependency data structures in the cache is reached, and whether an amount of data consumed by the dependency data structures in the cache is reached. Another possible approach determines whether a predetermined number of tracers have been sent by the agent to the manager. The agent checks for the number of tracers that have been sent on a thread, and if the number exceeds a limit, then the agent stops sending. This approach uses a clamping mechanism to limit the amount of information which is reported from the agent to the manager.

The process depicted flushes the cache when a batching limit is reached. A batching process is run at step 420. Step 422 includes checking the dependency data structures, such as to determine how many there are or the amount of data consumed by them. Decision step 426 determines if a batching limit is reached, such as a maximum number of dependency data structures or an amount of data consumed by them. If the limit is not reached, a wait is implemented at step 424, and step 422 is repeated. If the limit is reached, the batched bundle of dependency data structures is sent to the manager at step 428, and the cache is flushed at step 430.

FIG. 4d depicts a dependency data structure based on the process of FIG. 4c. Here, there are three examples transactions 430. A first transaction has a GUID1 and a dependency of A1→A2→B→C, a second transaction has a GUID2 and a dependency of A1→A2→B, and a third transaction has a GUID3 and a dependency of A1→C. A first dependency data structure 432 provided by agent A is for the dependency of A1→A2 of GUID1 and GUID2, and includes the same SeqId=1 for each transaction. When the first entry is made, no other instances of dependencies involving A1→A2 have yet been noted by agent A. When a subsequent, second invocation of A1→A2 occurs, a second entry is made in the dependency data structure 432 which adds the correlation data SeqId=1 and CorrId=GUID2, without creating a new dependency data structure.

A second dependency data structure 434 provided by agent A is for the dependency A1 alone, and includes SeqId=1 and CorrId=GUID3. A dependency data structure 436 provided by agent B is for the dependency B alone, and includes a first entry with SeqId=1:1 and CorrId=GUID1. When the first entry is made, no other dependencies involving B have yet been noted by agent B. When a subsequent, second invocation of B occurs, a second entry is made in the dependency data structure 436 which adds the correlation data SeqId=1:1 and CorrId=GUID2, without creating a new dependency data structure. Similarly, a dependency data structure 438 provided by agent C is for the dependency C alone, and includes a first entry with SeqId=1:1:1 and CorrId=GUID1. When the first entry is made, no other dependencies involving C have yet been noted by agent C. When a subsequent, second invocation of C occurs, a second entry is made in the dependency data structure 438 which adds the correlation data SeqId=1:1 and CorrId=GUID3, without creating a new dependency data structure.

When the dependency data structures are provided to a manager, the manager can correlate them to identify the caller-callee relationships among components in a transaction. For example, the manager can determine for GUID1 a sequence of: A1→A2 (from SeqId=1), then B (from SeqId=1: 1), then C (from SeqId=1:1:1). Similarly, the manager can determine for GUID2 a sequence of: A1→A2 (from SeqId=1), then B (from SeqId=1:1). Likewise, the manager can determine for GUID3 a sequence of: A1 (from SeqId=1), then C (from SeqId=1:1).

FIG. 5a depicts a sequence of components, some executing in different respective threads, and the use of a dependency flag. In another approach to identifying dependencies among components, a dependency flag is communicated between components. The agent associated with a component can set the flag the first time it detects a dependency of a component. For example, this may be the first time a component executes, calling or being called by, another component. In this situation, the agent decides that a dependency data structure for the component should be sent to the manager because this is the first time a dependency with the component has been detected. Further, setting the flag to true informs the agent of a called component that the calling component is part of a dependency which is unique to the agent of the calling component and should be sent to the manager as a separate dependency data structure. The flag is conveyed to each successive component which is called in a sequence.

For example, sequence A1→A2 may be a dependency which is first noticed by agent A, in which case agent A set dependency flag=true. When A2 calls B, the dependency flag is communicated to component B, the called component, with other correlation data of component A2, namely CorrID=GUID1 and SeqId=1:1. Components B similarly set the dependency flag=false in correlation data when calling C, and so on.

FIG. 5b depicts a second process for identifying dependencies among components. This process focuses on identifying all unique nodes. We use map tracers to track boundary components for every transaction passing through an application server, for instance. Every transaction has its own lightweight agent stack. We create dependency structures from the lightweight stack, and use a redundancy removal process to determine if a matching dependency structure already exists in the agent thread cache. If a match exists, we check the incoming request headers to see if the dependency flag is true or false. If it is true, the agent sends the dependency structure to the manager. If it is false, we discard the dependency structure without sending it to the manager. If there is no match between the created dependency structure and dependency structures in the cache, then we add the created dependency structure into the cache, and the agent sends the created dependency structure to the manager.

Regarding the correlation data, in addition to sending CorrId and SeqId, this solution adds another key-value pair (DependencyFlag, true or false). Whenever an agent decides that a dependency is unique and sends the dependency structure to the manager, it sets the dependency flag key value to true in the request header. For example, in FIG. 5a, when A2 calls B, if agent A determines that A2 (or A1→A2) is unique and sends its trace to the manager, it also sets the dependency flag to true on the call to B. The same correlation data is also embedded with the dependency structures for component A2 and B which are sent to the manager.

Specifically, at step 500, a transaction executes at a server, for instance. At step 502, the tracers are triggered for the components of the transaction which have been instrumented, when the components execute. At step 504, the tracers populate a lightweight stack. Step 506 includes checking the lightweight stack for a dependency. If a dependency is detected, at decision step 508, a dependency data structure is created at step 510.

Step 512 includes checking the value of the dependency flag in the incoming request header. If the flag=true, step 516 includes storing the created dependency data structure as a new dependency data structure in the cache. The newly created dependency data structure can be reported immediately to the manager or later in a batch process. Thus, the flag forces the agent of the called component to report the created dependency data structure to the manager regardless of a match with a pre-existing dependency data structure in its cache. However, if flag=false at step 512, step 514 includes comparing the created dependency data structure to dependency data structures which were previously stored in cache. If there is a match, step 518 includes discarding the created dependency data structure without storing it in the cache as a new dependency data structure. In this case, a matching dependency is present in the cache. Note that the comparison of step 514 need not be performed if the flag=true at step 512, reducing processing overhead. If there is no match at step 514, step 516 is performed to store the created dependency data structure as a new dependency data structure in cache.

As mentioned, the agents can communicate the dependency data structures in their respective caches to the manager from time to time for processing by the manager to provide graph data for a user interface.

FIG. 5c depicts dependency data structures based on the process of FIG. 5b. Sequences 530 indicate three example transactions. A first transaction has a GUID1 and a dependency of A1→A2→B→C. Additionally, the dependency flag sent to B is set to true by agent A assuming this is the first detection of the dependency A1→A2 by agent A. A second transaction has a GUID2 and a dependency of A1→A2→B. Here, the dependency flag sent to B is set to false by agent A since this is not the first detection of the dependency A1→A2 by agent A. A third transaction has a GUID3 and a dependency of A1→C. Here, the dependency flag sent to C is set to true by agent A since this is the first detection of the dependency A1 by agent A. Note that A1 and A1→A2 are different dependencies. Correlation information such as the GUID and SeqID may also be provided.

A first dependency data structure 532 for agent A identifies the dependency A1→A2, SeqId=1 and GUID1. A second dependency data structure 534 for agent A identifies the dependency A1, SeqId=1 and GUID3. Again, separate dependency data structures are provided for separate dependencies or sequences of invoked components which are associated with an agent. A dependency data structure 536 for agent B identifies the dependency B, SeqId=1:1 and GUID1. A dependency data structure 538 for agent C identifies the dependency C. Furthermore, a first entry identifies SeqId=1: 1:1 and GUID1, and a second entry identifies SeqId=1:1 and GUID3. Here, for efficiency, the second entry is added to the existing dependency data structure to include the correlation data of the second instance of the dependency C, rather than creating a new dependency data structure.

When the dependency data structures are provided to a manager, the manager can correlate them to identify the caller-callee relationships among components in a transaction. For example, the manager can determine for GUID1 a sequence of: A1→A2 (from SeqId=1), then B (from SeqId=1:1), then C (from SeqId=1:1:1). Similarly, the manager can determine for GUID3 a sequence of: A1 (from SeqId=1), then C (from SeqId=1:1). Note that the dependency of GUID2, A1→A2, is not provided in a dependency data structure, and therefore not provided to the manager, in one possible implementation, since it is a subset of the sequence of GUID1. This results in less overhead since less data is stored and sent to the manager.

FIG. 6a depicts a sequence of components, some executing in different respective threads, and the use of a caller name. In another approach to identifying dependencies among components, a caller name is communicated between components. The agent associated with a component in one thread which calls another component in another thread can send the caller's name with the correlation data. Each successive calling component in a sequence can also send its name with an inter-thread, intra-transaction call. The SeqId may be omitted in this approach.

For example, in the dependency A1→A2, A1 is the caller. For intra-thread calls, the calling component need not identify itself to the callee as this information can be ascertained by the agent based on the stack (see FIG. 3). For the inter-thread call A2→B, the caller's name, A2, can be included in the correlation data in the header, in one possible approach. Similarly, for the inter-thread call B→C, the caller's name, B, can be included in the correlation data.

FIG. 6b depicts a second process for identifying dependencies among components. This process focuses on identifying all unique edges/transitions between components. We use map tracers to track boundary components for every transaction passing through an application server, for instance. Every transaction has its own lightweight agent stack. We create dependency structures from the lightweight stack, and use a redundancy removal process to determine if a matching dependency structure already exists in the agent thread cache. If a match exists, we examine the value of a caller name parameter in the incoming request headers. The redundancy removal process checks to see whether or not the dependency structure in combination with the caller name is unique. If the combination is unique, then it modifies the dependency structure to comprise the caller name, stores the modified dependency structure in the cache, and sends the modified dependency structure to the manager. If the combination is not unique, the dependency structure is discarded without being stored in the cache or sent to the manager. If there is no match between the created dependency structure and dependency structures in the cache, then we add the created dependency structure into the cache, and the agent sends the created dependency structure to the manager.

Regarding the correlation data, in addition to sending CorrId, this solution adds the caller name key-value pair to the request headers. Whenever an agent transaction makes a cross-process call, e.g., a call to a different agent, the calling agent adds the calling component's name to the header of the outgoing request. For example, referring to FIG. 6a, when A2 calls B, agent A adds the caller name value as "A2" on the request header. On the receiving end of the call, agent B receives the caller name value while processing the dependency structure for B. When agents A and B send their dependency structures to the manager, the same correlation data is also embedded with the dependency structures for components A and B, respectively. The manager uses this correlation data to draw a directed edge between the two dependencies.

Specifically, at step 600, a transaction executes at a server, for instance. At step 602, the tracers are triggered for components of the transaction which have been instrumented, when the components execute. At step 604, the tracers populate a lightweight stack. Step 606 includes checking the lightweight stack for a dependency. If a dependency is detected, at decision step 608, a dependency data structure is created at step 610.

Step 612 includes comparing the created dependency data structure to dependency data structures which were previously stored in cache. If there is a match, e.g., a matching dependency is present in the cache, step 616 includes checking the name of the calling component in an incoming request header, and step 618 includes determining if the name of the calling component in combination with the dependency of the created dependency structure is new. If it is new, step 620 includes adding the name of the calling component, and other correlation data, to the matching dependency data structure which already exists in the cache, without creating a new dependency data structure. Again, this approach reduces overhead. If the combination at step 618 is not new, step 622 includes discarding the created dependency data structure, without creating a new dependency data structure. This avoids the need to maintain a record of redundant information. If there is no match at step 612, step 614 stores the created data structure dependency structure in cache.

As mentioned, the agents can communicate the dependency data structures in their respective caches to the manager from time to time for processing by the manager to provide graph data for a user interface.

Figure 6C:
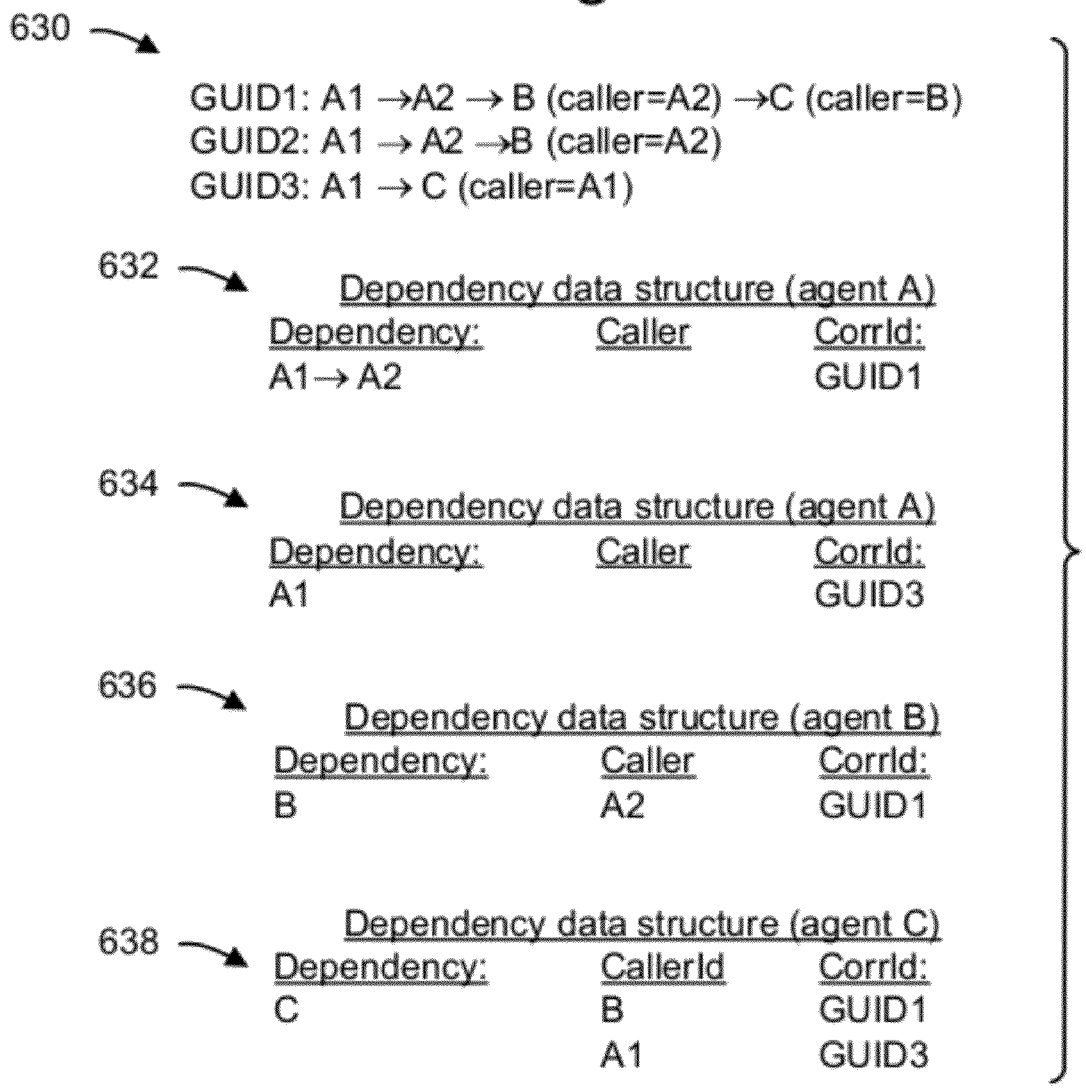
FIG. 6c depicts dependency data structures based on the process of FIG. 6b.

FIG. 6c depicts dependency data structures based on the process of FIG. 6b. Sequences 630 indicate three example transactions. A first transaction has a GUID1 and a dependency of A1→A2→B→C. Additionally, B is informed that its caller is A2 and C is informed that its caller is B. A second transaction has a GUID2 and a dependency of A1→A2→B, where B is informed that its caller is A2. A third transaction has a GUID3 and a dependency of A1→C, where C is informed that its caller is A1.

A first dependency data structure 632 for agent A identifies the dependency A1→A2 and GUID1. Here, there is no caller since the dependency is at the start of the transaction. A second dependency data structure 634 for agent A identifies the dependency A1 and GUID3. Again, there is no caller since the dependency is at the start of the transaction. A dependency data structure 636 for agent B identifies the dependency B, the caller A2 and GUID1. A dependency data structure 638 for agent C includes a first entry which identifies the caller B and GUID1, and a second entry which identifies the caller A1 and GUID3. Here, the second entry is added to the existing dependency data structure to include the caller's name, rather than creating a new dependency data structure.

When the dependency data structures are provided to a manager, the manager can correlate them to identify the caller-callee relationships among components in a transaction. For example, the manager can determine for GUID1 a sequence of: A1→A2 (no caller), then B (since A2 is the caller), then C (since B is the caller). Similarly, the manager can determine for GUID3 a sequence of: A1 (no caller), then C (since A1 is the caller). Note that the dependency of GUID2, A1→A2, is not provided in a dependency data structure, and therefore not provided to the manager, in one possible implementation, since it is a subset of the sequence of GUID1. This results in less overhead since less data is stored and sent to the manager.

Figure 7A:
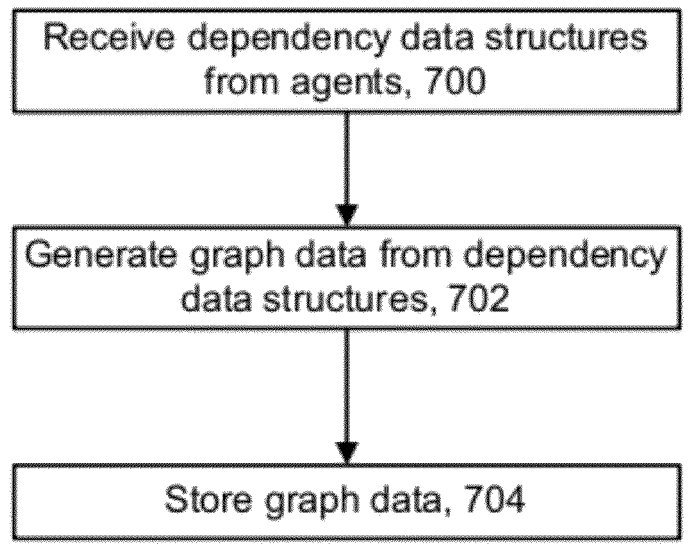
FIG. 7a depicts a process in which a manager creates graph data.

FIG. 7a depicts a process in which a manager creates graph data. As mentioned, the dependency data structures which are received by the manager can be used to create graph data, e.g., data which can provide a display on a user interface to identify dependencies among components and the services they represent. Step 700 includes receiving dependency data structures from the agents. Step 702 includes generating graph data from the dependency data structures, and step 704 includes storing the graph data, such as in a database. Further, the graph data can be updated as additional dependency data structures are received from time to time.

Figure 7B:
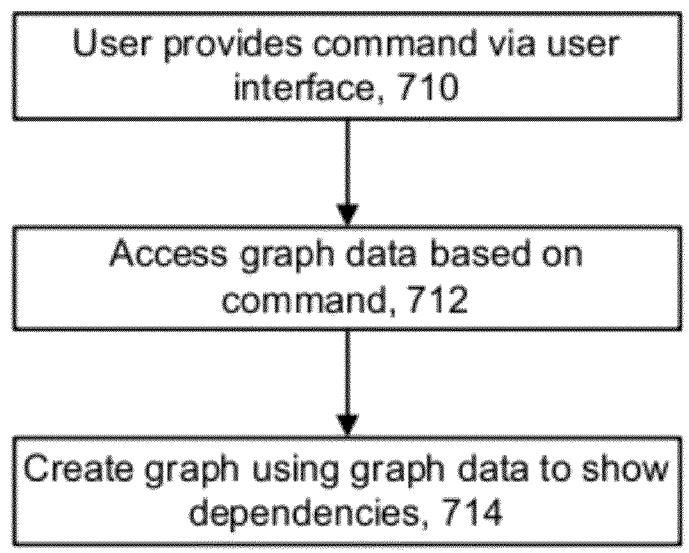
FIG. 7b depicts a process in which graph data is accessed to create a graph.

FIG. 7b depicts a process in which graph data is accessed to create a graph. Once the graph data has been created by the manager, it can be accessed by a user via a user interface in which the user enters commands. Typically, a selected portion of the graph data is accessed at a time based on the user's commands. At step 710, the user provides a command via the user interface. Step 712 includes accessing the graph data based on the command. Step 714 includes creating a graph using the graph data to show dependencies among the components of one or more applications or other programs.

Figure 8:
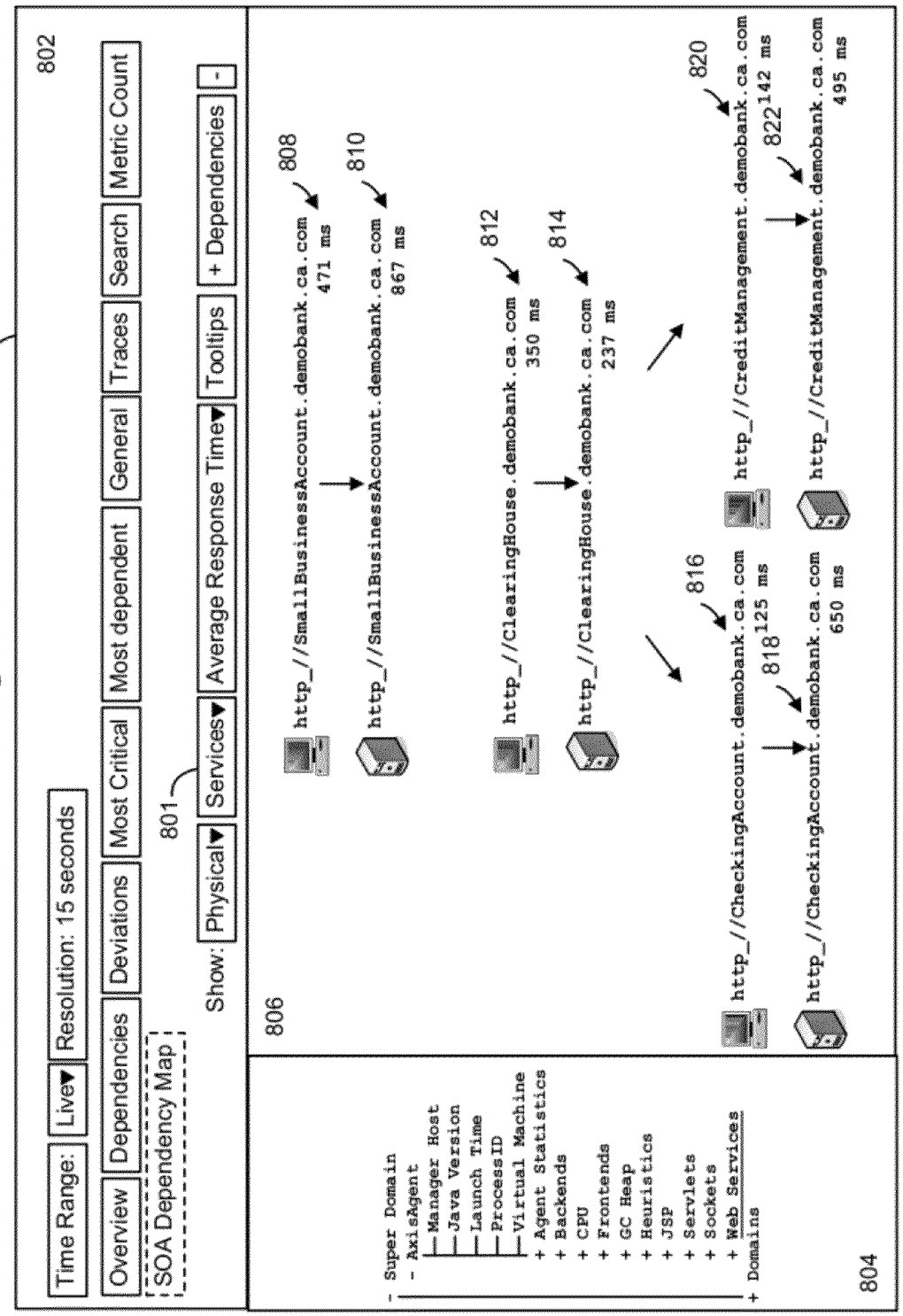
FIG. 8 depicts an example user interface showing dependencies among services.

FIG. 8 depicts an example user interface 800 showing dependencies among services. The user interface includes a tools region 802, a tree region 804 and a results region 806. The tools region 802 provides status information and a number of tools for configuring the displayed results. A "Time Range" option allows the user to select a prior, historical time period, or "Live" data. Here, "Live" data is selected using a drop down menu. A "Resolution" is identified as being 15 seconds, which means the results region 806 is updated at that interval.

A number of options may be provides as tabs. Each tab corresponds with a new display in the region 806. An "Overview" tab can be selected to provide an overview of results. A "Dependencies" tab can be selected to provide a view of all component dependencies. A "Deviations" tab can be selected to provide a view of components whose performance deviates from expected normal ranges. A "Most Critical" tab can be selected to provide a view of components which have been deemed to be most critical. A "Most Dependent" tab can be selected to provide a view of components which are most depended on, e.g., most frequently called, by other components. A "General" tab can be selected to provide general information regarding the application and/or computer systems which are being monitored. A "Traces" tab can be selected to provide a view of a trace such as depicted in FIG. 3. A "Search" tab can be selected to provide a search box in which the user enters a keyword to search for like-named components. A "Metric Count" tab can be selected to provide a view of metrics associated with the components. A "SOA Dependency Map" can be selected to provide a Service-Oriented Architecture (SOA) view of services represented by the components. This tab is currently selected so that the results region 806 provides this view.

Other selections in the tools region 802 include a drop down menu which is selected to "Physical," a drop menu 801 which is selected to "Services," a drop menu which is selected to provide "Average Response Time," causing responses times in milliseconds to be displayed in the region 806, a "Tooltips" button, a "+Dependencies" button, which can be selected to expand a view of dependencies in the region 806, and a "-" (Dependencies) button, which can be selected to collapse a view of dependencies in the region 806.

The tree region 804 identifies a hierarchy of nodes which can be expanded and collapsed to see additional nodes or fewer nodes, respectively, and to control the graph data which is accessed for display in the region 806. "Super Domain" is the top node. A sub-node is "Axis Agent" which includes a number of further sub-nodes: "Manager Host," which is the host on which the manager process runs, "Java Version," "Launch Time," "ProcessID," and "Virtual Machine." Other sub-nodes of "AxisAgent" include "Agent Statistics," which provides statistical information regarding the agents, e.g., number of traces received, "Backends," which provides information regarding backend computing resources, "CPU," which provides information regarding CPUs consumed in the computing resources, and "Frontends," which provides information regarding frontend computing resources. Other sub-nodes include "GC Heap," which provides information regarding a garbage collection heap, and "Heuristics," which are rules which are set to process data. "JSP," "Servlets," and "Sockets" provide information regarding components of the specified type.

A "Web Services" sub-node has been selected so that the results region 806 provides a view of all web services which are represented by the components in the dependency data structures. This sub-node can be expanded, as seen in FIG. 9b, to allow the user to select specific services. The results region 806 which is depicted thus provides a services view of all web services. As mentioned, the components can be associated with services by URLs, in one possible implementation. Here, the services are web services which relate to a banking application, although this is merely one example among many possibilities. Further, the specific layout and design of the region 806 is merely one example among many possibilities.

The URLs 808 and 810 thus represent a dependency of the service represented by URL 808 on the service represented by URL 810. This is a simple example as there are only two components in the sequence. A more involved example is depicted by a client service of URL 812 (http //ClearingHouse.demobank.ca.com), which depends on a like-named server service of URL 814, which in turn branches off into two lines of dependencies. In a first branch, the server service of URL 814 depends on the client service of URL 816 (http //CheckingAccount.demobank.ca.com), which in turn depends on a like-named server service of URL 818. In a second branch, the server service of URL 814 depends on the client service of URL 820 (http //CreditManagementAccount.demobank.ca.com), which in turn depends on a like-named server service of URL 822. Note that additional services may be viewed by scrolling down or sideways in the region 806. An average response time of the services is also provided. The user interface 800 thus provides an intuitive view to assist in efficiently identifying relationships between components in an application and the services they provide.

Figure 9A:
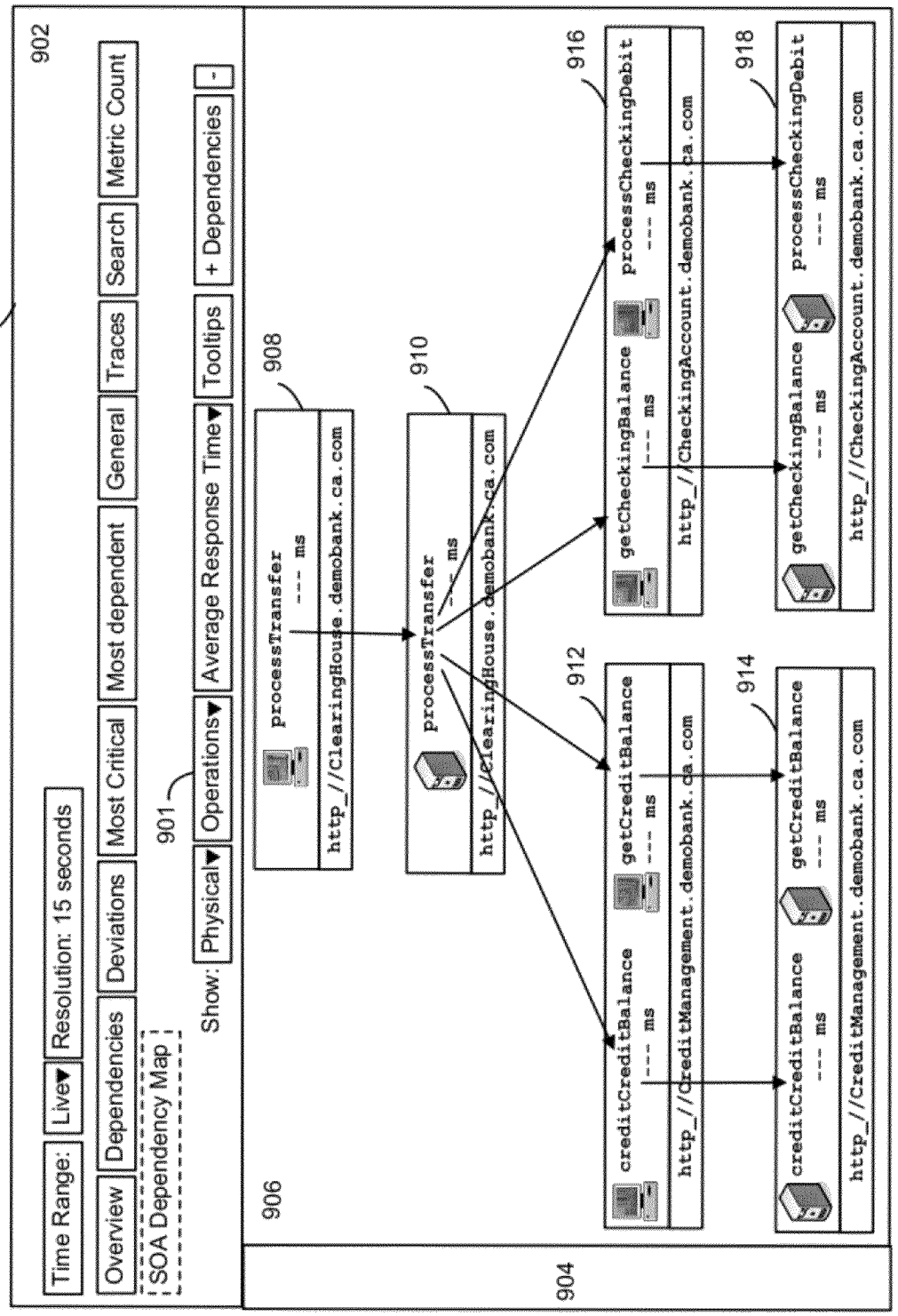
FIG. 9a depicts an example user interface showing dependencies among operations.

FIG. 9a depicts an example user interface 900 showing dependencies among operations. The interface 900 corresponds to that of FIG. 8, except the "Services" drop down menu 901 is selected to "Operations" in the options region 902 to provide an operations view of the web services. The tree region 904 is depicted In FIG. 9b.

FIG. 9b depicts a portion 904 of the user interface of FIG. 9a. Here, the user has expanded the "Web Services" node to see sub-nodes for a client and a server. Further, sub-nodes under "Client" include a collapsed node for the service represented by URL 816 (http_//CheckingAccount.demobank.ca.com), and an expanded node for the service represented by URL 812 (http_//ClearingHouse.demobank.ca.com). Under this node are sub-nodes for associated metrics/performance data such as average response time, concurrent invocations, errors per interval, responses per interval and stall count. Selection of the sub-node causes a new display in the results region 906 with details of the corresponding metric. Other sub-nodes of the client http_//ClearingHouse.demobank.ca.com include a collapsed node for a process or class "process transfer." Also under the "Client" node is a collapsed node for the service represented by URL 808 (http_//SmallBusinessAccount.demobank.ca.com).

Sub-nodes under "Server" include a collapsed node for the service represented by URL 818 (http_//CheckingAccount.demobank.ca.com), a collapsed node for the service represented by URL 814 (http_//ClearingHouse.demobank.ca.com), and a collapsed node for the service represented by URL 810 (http_//SmallBusinessAccount.demobank.ca.com).

With the "process transfer" sub-node selected by the user in the tree region 904, the results region 906 depicts, in box 908, the client-side process titled "processTransfer," an average response, and the URL of the associated client-side service. Box 910 depicts the server-side process titled "processTransfer," an average response time, and the URL of the associated server-side service. This identifies the dependency of the process or class of box 908 on that of box 910. Further, the server-side process of box 910 is dependent on the client-side processes "creditCreditBalance" and "getCreditBalance" in box 912. Thus, dependencies of multiple processes or classes of one service are identified. Box 914 indicates that the server-side processes "creditCreditBalance" and "getCreditBalance" are depended on by the like-named respective client-side processes. The server-side process of box 910 is also dependent on the client-side processes "getCheckingBalance" and "processCheckingDebit" in box 916. Box 918 indicates that the server-side processes "getCheckingBalance" and "processCheckingDebit" are depended on by the like-named respective client-side processes.

Figure 10:
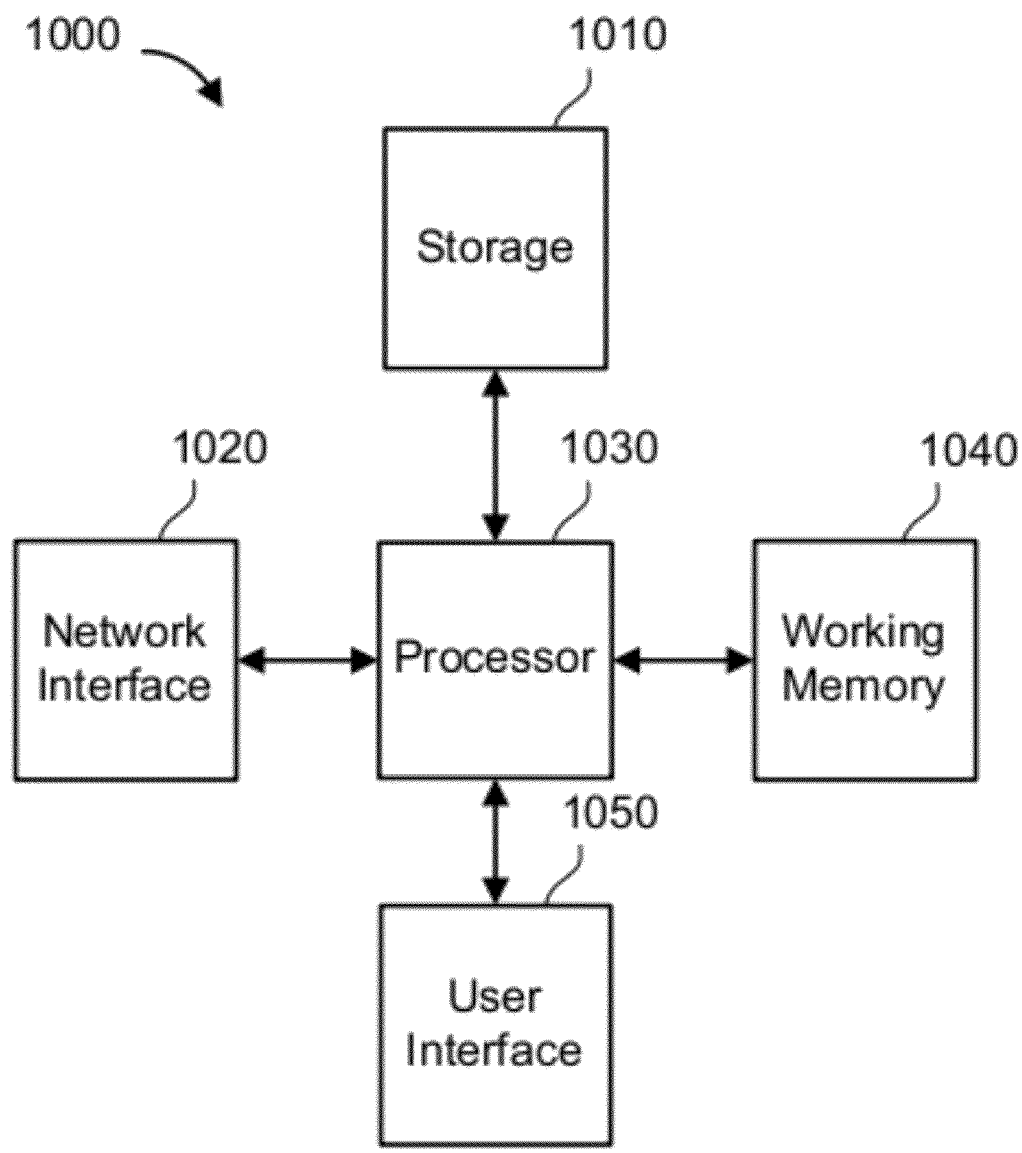
FIG. 10 depicts a computer system.

FIG. 10 depicts a computer system. The computer system 1000 is a simplified representation of a system which might be used as one of the application servers, or the manager, of FIG. 1. The computer system 1000 includes a storage device 1010 such as a hard disk or portable media, a network interface 1020 for communicating with other computer systems, a processor 1030 for executing software instructions, a working memory 1040 such as RAM for storing the software instructions after they are loaded from the storage device 1010, for instance, and a user interface display 1050, in particular, for the manager computer 120. The storage device 1010 may be considered to be a processor readable storage device having processor readable code embodied thereon for programming the processor 1030 to perform a method for identifying dependencies among instrumented components in an application. The user interface display 1050 can provide information to a human user based on the dependency data structures received from one or more agents. The user interface display 1050 can use any known display scheme, whether graphical, tabular or the like, and include associated information, including performance, resource and annotative data, described previously.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for identifying dependencies among components in an application, comprising:

monitoring execution of the application using an agent;

in response to the monitoring, obtaining: (a) an identifier of a called component, the called component executes in one thread of a transaction and is called by a calling component which executes in another thread of the transaction, and (b) a sequence identifier which identifies an order in which the called component was called by the calling component among multiple components which are called by the calling component in the transaction;

determining, at the agent, if there is an existing data structure comprising the identifier of the called component in a store;

if there is the existing data structure in the store, adding the sequence identifier to the existing data structure;

if there is not the existing data structure in the store, providing a new data structure comprising the identifier of the called component and the sequence identifier in the store; and communicating the existing or new data structure in the store from the agent to a manager computer for use in providing a graphical user interface which depicts dependencies among components of the application.

2. The computer-implemented method of claim 1, further comprising:

populating a stack for boundary components of the transaction with the identifier of the called component, the boundary components are marked by tracers of the application and the agent obtains the identifier of the called component from the stack.

3. The computer-implemented method of claim 1, wherein:

the existing or new dependency data structure in the store is communicated from the agent to the manager computer in a batch, when at least one of: a predetermined number of the data structures in the store is reached, and a predetermined time period has passed.

4. The computer-implemented method of claim 1, wherein:

the sequence identifier identifies a number, which is two or more, of prior components in a sequence of components, prior to the called component of the one thread.

5. A computer-implemented method for identifying dependencies among components in an application, comprising:

monitoring execution of the application using an agent;

in response to the monitoring, obtaining an identifier of a called component, the called component executes in one thread of a transaction and is called by another component which executes in another thread of the transaction, and to access a flag which is communicated to the called component by the calling component in a request header;

if the flag is set one way, providing a new structure in a store, the new data structure comprises the identifier of the called component and a sequence identifier, the sequence identifier indicates a sequence in which the called component was called;

if the flag is set another way: determining if there is an existing data structure comprising the identifier of the called component in the store; and if there is the existing data structure in the store, adding an identifier of the transaction to the existing data structure without creating a new data structure in the store;

if the flag is set the another way, and if there is not the existing data structure in the store, providing the new data structure in the store; and communicating the existing or new data structure in the store to a manager computer for use in providing a graphical user interface which depicts dependencies among components of the application.

6. The computer-implemented method of claim 5, further comprising:

populating a stack for boundary components of the transaction with the identifier of the called component, the boundary components are marked by tracers of the application; and creating a data structure from the stack, the determining if there is the identifier of the called component in the store comprises comparing the created data structure to a data structure in the store.

7. The computer-implemented method of claim 5, wherein:

the identifier of the called component is obtained by a first agent which is associated with the one thread; and a second agent which is associated with the another thread sets the flag.

8. The computer-implemented method of claim 5, wherein: the sequence identifier identifies: a number, which is two or more, of prior components in the sequence, prior to the called component, and an order in which the called component is called by the calling component among multiple components which are called by the calling component.

9. A computer-implemented method for identifying dependencies among instrumented components in an application, comprising:

receiving data structures at a manager computer, the data structures comprise identifiers of boundary components of the application which execute in different threads of a transaction, and an indication of caller-callee relationships among the boundary components, the boundary components are marked by tracers of the application, one of the data structures comprises an identifier of a called component which is called by a calling component, and a sequence identifier which identifies an order in which the called component is called by the calling component among multiple components which are called by the calling component in the transaction, and a number, which is two or more, of prior components in a sequence of components, prior to the called component, and another of the data structures comprises an identifier of another called component which is called by another calling component, and an identifier of the another calling component;

preparing graph data based on the data structures, the graph data is based on the identifiers of the boundary components and the indication of the caller-callee relationships;

receiving a user command via a graphical user interface to access the graph data for at least a portion of the boundary components;

accessing the graph data based on the user command; and providing a graphical user interface using the accessed graph data, the graphical user interface depicts caller-callee relationships among the at least a portion of the boundary components, and names of services of the application which are represented by the at least a portion of the boundary components.

10. The computer-implemented method of claim 9, wherein:

the data structures comprise transaction identifiers which are used for correlating different data structures received from different agents.

11. The computer-implemented method of claim 9, wherein:

the names of the services provided on the graphical user interface comprise URLs, and the graphical user interface identifies caller-callee relationships among the URLs.

12. The computer-implemented method of claim 11, wherein:

the names of the services provided on the graphical user interface comprise class names, and the graphical user interface identifies which class names are associated with which URLs.

* * * * *